(12) United States Patent
Simons et al.

(10) Patent No.: US 7,895,529 B1
(45) Date of Patent: Feb. 22, 2011

(54) SYSTEM AND METHOD FOR PROCESSING FEATURED CONTENT

(75) Inventors: Nicholas Simons, Redmond, WA (US); Matthew Charles Gauthier, Kirkland, WA (US); Alberto Swett, Redmond, WA (US); Mitali Madhumita Pattnaik, London (GB); Christopher Todd Seitzinger, Duvall, WA (US); Andrew Kwatinetz, Seattle, WA (US); Glenn L. Frankel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 994 days.

(21) Appl. No.: 10/658,943

(22) Filed: Sep. 10, 2003

(51) Int. Cl.
G06F 3/048 (2006.01)
G06F 3/00 (2006.01)

(52) U.S. Cl. .................. 715/810; 715/707; 715/708; 715/709; 713/1

(58) Field of Classification Search .............. 715/709, 715/707–708, 810
See application file for complete search history.

(56) References Cited

U.S. PATENT DOCUMENTS

| | | | |
|---|---|---|---|
| 5,317,688 A * | 5/1994 | Watson et al. ............... 715/707 |
| 5,513,308 A * | 4/1996 | Mori ........................... 715/707 |
| 5,550,967 A * | 8/1996 | Brewer et al. ............... 715/709 |
| 5,715,415 A * | 2/1998 | Dazey et al. ................ 715/708 |
| 5,933,140 A * | 8/1999 | Strahorn et al. ............. 715/712 |
| 6,195,651 B1 * | 2/2001 | Handel et al. ................... 1/1 |
| 6,199,099 B1 * | 3/2001 | Gershman et al. ........... 709/203 |
| 6,208,338 B1 * | 3/2001 | Fischer et al. ............... 715/705 |
| 6,340,977 B1 * | 1/2002 | Lui et al. ..................... 715/709 |
| 6,405,309 B1 * | 6/2002 | Cheng et al. ................... 713/1 |
| 6,513,031 B1 | 1/2003 | Fries et al. |
| 6,542,163 B2 * | 4/2003 | Gorbet et al. ............... 715/711 |
| 6,549,217 B1 * | 4/2003 | De Greef et al. ............ 715/745 |
| 6,636,961 B1 * | 10/2003 | Braun et al. .................... 713/1 |
| 6,687,485 B2 * | 2/2004 | Hopkins et al. ............. 434/350 |
| 6,757,691 B1 * | 6/2004 | Welsh et al. ...................... 1/1 |
| 6,832,371 B1 * | 12/2004 | Hussey ........................ 717/165 |
| 6,882,825 B2 * | 4/2005 | Hopkins et al. ............. 434/350 |

(Continued)

OTHER PUBLICATIONS

Baraglia, R. and Palmerini, P., "SUGGEST: A Web Usage Mining System," *Proceedings of the International Conference on Information Technology: Coding and Computing (ITCC'02)*, CNUCE, Istituto del Consiglio Nazionale delle Richerche (CNR), Pisa, Italy, 2002.

(Continued)

*Primary Examiner*—Steven B Theriault
(74) *Attorney, Agent, or Firm*—Merchant & Gould

(57) ABSTRACT

A system and method for retrieving, storing and displaying featured content. In one embodiment, featured content is queried from a database storing a list of featured content items. The featured content items stored in the database may include any type of data, such as text data, hyperlink text data, markup document data, computer code, or other types or combinations of data related to a particular topic. Responsive to the query, a set of featured content items is stored in a cache file. A predetermined number of featured content items stored in the cache file are selected and stored in a system registry. Upon receipt of a display command, featured content items are read from the system registry and displayed on an interface. The displayed featured content items can be used to display hyperlinks, announcements, or other information, without inhibiting the efficiency of the boot process of a software application.

20 Claims, 12 Drawing Sheets

U.S. PATENT DOCUMENTS

| | | | |
|---|---|---|---|
| 6,886,017 B1 * | 4/2005 | Jackson et al. .................... | 1/1 |
| 6,944,817 B1 * | 9/2005 | Danneels .................... | 715/207 |
| 6,963,908 B1 * | 11/2005 | Lynch et al. ................ | 709/220 |
| 7,100,115 B1 * | 8/2006 | Yennaco .................... | 715/748 |
| 7,127,675 B1 * | 10/2006 | Kates et al. ................ | 715/705 |
| 7,716,163 B2 * | 5/2010 | Reynar et al. .................... | 1/1 |
| 2001/0054020 A1 * | 12/2001 | Barth et al. .................... | 705/37 |
| 2002/0095657 A1 * | 7/2002 | Vaidyanathan et al. ...... | 717/110 |
| 2002/0118220 A1 * | 8/2002 | Lui et al. .................... | 345/709 |
| 2002/0126140 A1 * | 9/2002 | Gorbet et al. .............. | 345/708 |
| 2003/0020746 A1 * | 1/2003 | Chen et al. ................ | 345/741 |
| 2003/0174159 A1 * | 9/2003 | Nordahl et al. ............. | 345/708 |
| 2003/0196094 A1 * | 10/2003 | Hillis et al. ................. | 713/179 |
| 2004/0034637 A1 * | 2/2004 | Riche et al. .................... | 707/9 |
| 2004/0088381 A1 * | 5/2004 | Borman et al. .............. | 709/219 |

OTHER PUBLICATIONS

Gao, W, et al., "A Dynamic Recommendation System Based on Log Mining," *International Journal of Foundations of Computer Science*, 13(4), 521-350, 2002.

Yan, T.W. et al., "From User Access patterns to Dynamic Hypertext Linking," *Fifth International World Wide Web Conference*, Paris, France, May 6-10, 1996 <http://www5conf.inria.fr/fich_html/papers/P8/Overview.html> [retrieved Aug. 21, 2003].

* cited by examiner

| ID | ASSET ID | PRIORITY | UPDATED | CREATION | OF INTEREST | Featured Content Item |
|---|---|---|---|---|---|---|
| 1 | WORD | N | 1/1/03 | 1/1/03 | FALSE | NEED HELP? GO TO: WWW.MICRO... |
| 2 | OUTLOOK | N | 1/12/03 | 1/12/03 | TRUE | To move text, highlight a group of... |
| 3 | WORD | N | 7/1/02 | 7/1/02 | TRUE | <IMAGE FILE> SYSTEM HELP: 1-80... |
| 4 | WORD | Y | 1/30/03 | 1/30/03 | TRUE | Virus Alert for Word!!! See, www.micro... |
| 5 | VISIO | N | 1/30/03 | 1/20/03 | FALSE | You may select multiple drawings by... |
| ... | ... | ... | ... | ... | ... | ... |

SYSTEM AND METHOD FOR PROCESSING FEATURED CONTENT

FIELD OF THE INVENTION

The present invention relates to computer programs and, in particular, a method and system for retrieving, storing, and displaying featured content.

BACKGROUND OF THE INVENTION

Many existing software applications provide support functions that display suggestions, announcements, or other featured content to aid users. The display of featured content is often used to highlight new features of a software application, share new user tips, provide user instruction, etc. For example, during the boot process of Microsoft Word®, the application may display a message that greets a user and describes a user tip, e.g., a message describing an efficient method for organizing Word® documents into folders. To facilitate such support functions, some software applications include a static list of messages featuring certain topics that may be of interest to users. When a command to display a message is invoked, which may be during a boot process or upon receipt of a user command, a message is randomly selected from the static list and displayed to the user.

Although the above-described support functions are useful in displaying suggestions, announcements, or other featured content, existing systems have a number of drawbacks. For instance, existing software applications are limited to a fixed number of messages that can be displayed because the messages are hard-coded in the application files prior to the application's release date. The hard-coded messages are limited to concepts that were conceived prior to the application's release date. In addition, the messages may become ineffective because the display of each message is repeated over a period of time. In addition to having the potential of becoming ineffective, the messages may become incorrect over time. For instance, if a Web address or a help-line telephone number is contained in a message, the message may not communicate correct information if the displayed Web address or telephone number changes after the application's release date.

The above-described support functions also present other problems associated with the performance of a software application. For instance, if a software application selects, retrieves, and displays a text message during the boot process of the application, the duration of the boot process may be unnecessarily prolonged. The boot process is inhibited because of the need to use complex instructions that are associated with reading data from files stored on a hard drive. Thus, the above-described support functions work against the long-standing need to continually improve the speed and efficiency of the boot process of software applications.

There are also many other problems associated with featured content when it is displayed on a Web-based application. For example, if a Web page is configured to describe a particular software product, the Web page may be configured with a section having special instructions, announcements or other featured content related to the product. Unfortunately, many Web pages are static in nature, meaning the Web page only displays the content that is coded in the underlying markup language. Thus, if the instructions, announcements or other featured content needs to be updated, an administrator has to select new featured content and modify the underlying markup language of the Web page to display the new featured content. The process of manually updating featured content displayed on a Web page, especially when the modifications apply to a large volume of Web pages, is a labor intensive process that is subject to additional problems caused by human error.

As will be readily understood from the foregoing, there is a need for an improved system and method for selecting and displaying featured content. In addition, there is a need for a system and method for minimizing the delay time that is caused by the display of messages during the boot process of a software application.

SUMMARY OF THE INVENTION

The present invention is directed to a system, method, and computer-readable medium for retrieving, storing, and displaying featured content. For purposes of illustrating the present invention, featured content may be any type of data, such as text data, image data, hypertext link data, markup document data, computer code, or other types or combinations of data that communicate a message or information related to a particular topic.

In accordance with one aspect, the present invention provides a method, system, and computer-readable medium that allows software applications to access a dynamically updated database of featured content items. A calling software application utilizing the present invention sends a query to the database to obtain featured content items associated with a topic. Next, the database returns a data set of featured content items to the calling software application and the data set is stored in a cache file. A predetermined number of featured content items stored in the cache file are selected and stored in a system registry. Upon receipt of a display command, which may occur during the boot process of the calling software application, the featured content items stored in the system registry are displayed on an interface. Hyperlinks, announcements, or other information can be displayed without inhibiting the efficiency of the boot process of a software application.

In one embodiment of the present invention, the above-described method is used to display featured content items that communicate user instructions. For example, featured content items may be positioned in a graphical user interface to provide users with some guidance on conducting a keyword search. One specific embodiment displays a sample search string near a text input field of a search program. When a sample search string is obtained and stored by the use of the above-described method, the search string is dynamically updated on the interface of the search program. This embodiment provides a mechanism for providing new and/or popular search strings suggestions in a search program.

In another aspect, the present invention provides a method and system for displaying featured content items on a Web page. Generally described, this embodiment automatically retrieves, selects, and integrates featured content items into a Web page so that the underlying code of the Web page does not have to be manually updated each time a featured content is modified. In one specific embodiment, keywords or other identifiers are included in a Web page request. When the Web page request is received by a Web server, the keywords or other identifiers are sent to a database search application in the form of a database query. The database search application obtains the query and returns a data set of featured content items. The data set is then integrated into a Web page for display of the featured content items.

In yet another aspect, the present invention provides a method and system for dynamically updating featured content items stored in a database. This aspect of the invention provides an automated process for updating featured content items so that the above-described embodiments can readily obtain and display new messages that are of interest to users. In an exemplary embodiment, an update method is periodically executed. During execution, the update method updates various database attributes that characterize a popularity rating and a priority rating in each item stored in a database. The update method also examines one or more time stamps to determine if individual featured content items have expired.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following description of the present invention first provides an overview of a computer network in which the present invention may be implemented. Following that, a description of a method for retrieving and displaying featured content items is described and shown in accompanying flow diagrams. In addition, the description summarizes a method for retrieving and displaying featured content items to be displayed in a Web-based application. Lastly, a description of a method for updating a database of featured content items is described and shown. The illustrative examples described herein are not intended to be exhaustive or to limit the invention to the precise forms disclosed. Similarly, any process steps described herein may be interchangeable with other steps, or several combinations of steps, in order to achieve the same result.

Figure 1:
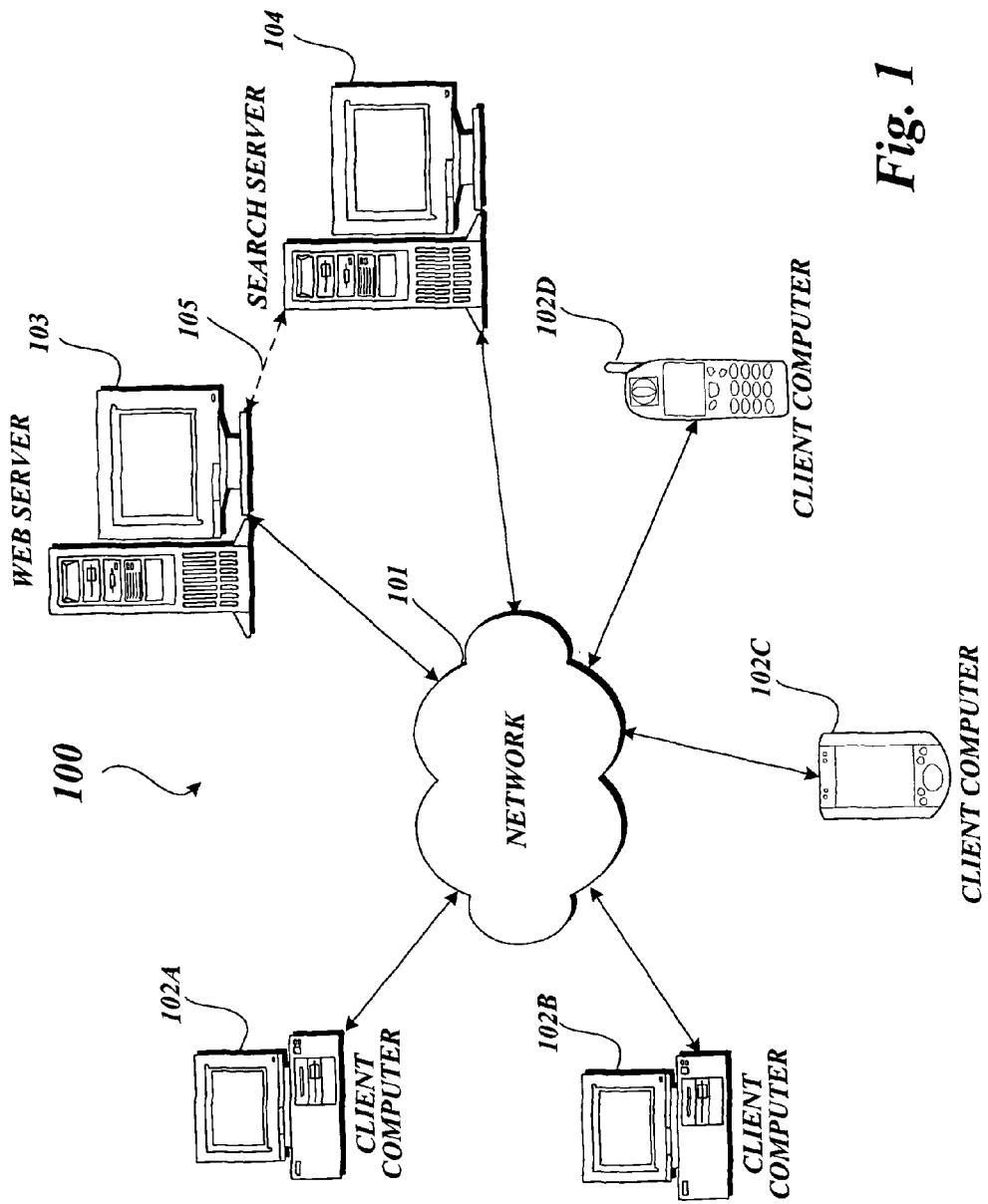
FIG. 1 is a pictorial diagram of a number of computer-type devices connected to a network, including a number of client computers and devices, and a server, for allowing a number of users to communicate via client-server software applications.

Referring to FIG. 1, the following is intended to provide an exemplary overview of a computer network 100 in which the invention may be implemented. The illustrated computer network 100 comprises a plurality of client computers and devices 102A, 102B, 102C, 102D, a Web server 103, and a search server 104. The client computers and devices are illustrated as personal computers (PCs), including portable PCs 102A, 102B, a personal digital assistant (PDA) 102C, and a telephone 102D. Obviously, these client computers and devices should be considered as exemplary and not limiting. The client computers and devices and the servers, depicted in FIG. 1, are configured to electronically communicate via a network 101. The network 101 may be a local area network (LAN) or a larger network, such as a wide area network (WAN) or the Internet. In addition, the Web server 103 and the search server 104 may be controlled by a single entity and thus also configured to electronically communicate via a second LAN 105. Although this example shows a configuration using two servers, the system and method of the present invention may be implemented on other computer system configurations having one server, or many more servers than those shown in FIG. 1.

As known to those having ordinary skill in the art and others, the computer network 100 may be configured to exchange documents, commands, and other known types of information between the client computers and devices 102A, 102B, 102C, 102D and servers 103 and 104. As will be appreciated by those skilled in the art and others, the computer network 100 shown in FIG. 1 is a simplified example of one suitable computer network for implementing the present invention and that the present invention is not limited to this example.

Figure 2:
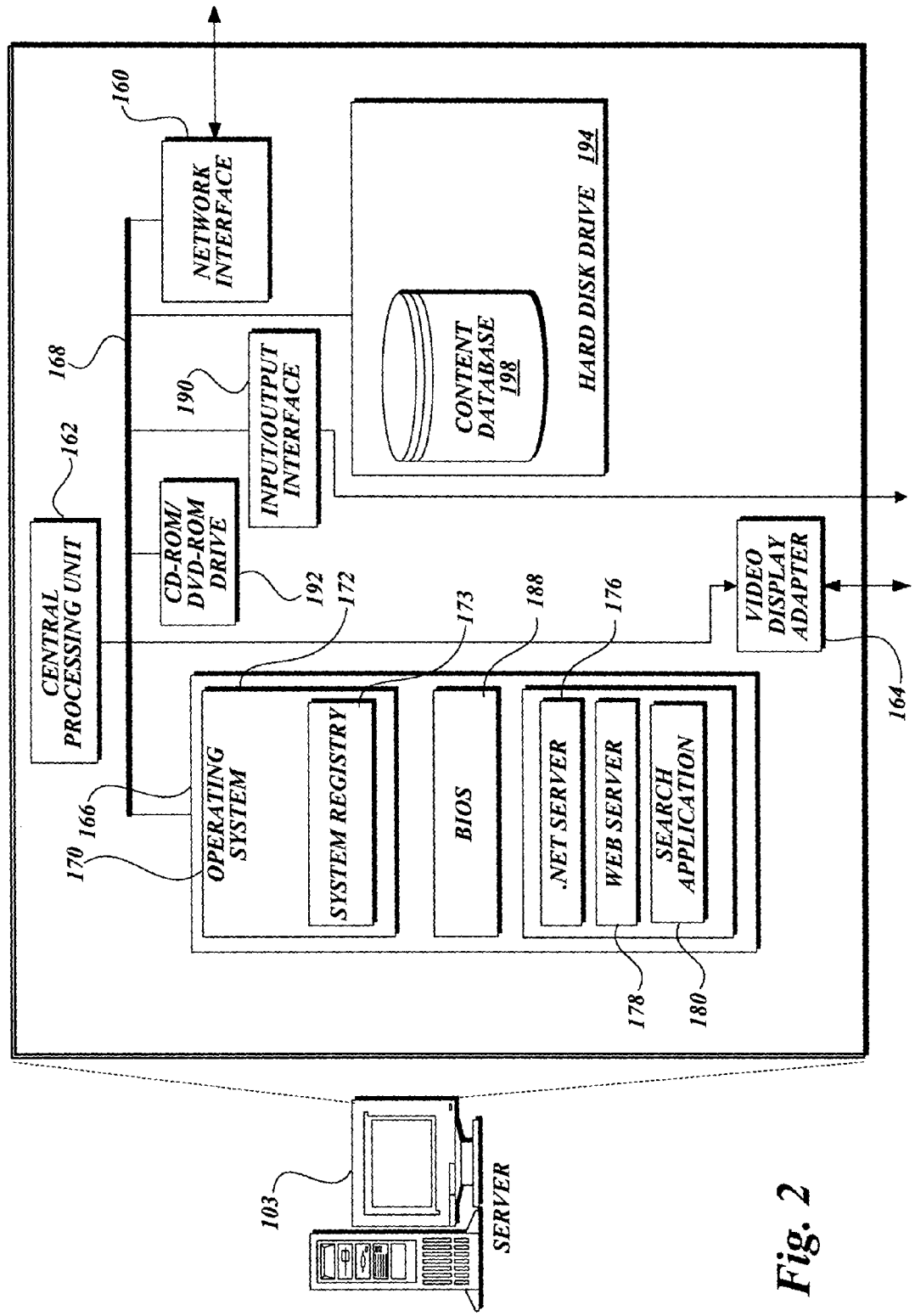
FIG. 2 is a schematic block diagram of an exemplary embodiment of the server depicted in FIG. 1.

FIG. 2 depicts the general components of an exemplary computer for use in a system of the type shown in FIG. 1. As described in more detail below, this exemplary computer may be used to form the servers 103 and 104 as well as the client computers and devices 102A, 102B, 102C, 102D. For illustrative purposes, the exemplary computer of FIG. 2 shows specific components for use in the Web server 103. Those of ordinary skill in the art and others will appreciate that the Web server 103 may (and likely will) include many more components than those shown in FIG. 2. However, it is not necessary that all of these generally conventional components be shown in order to disclose an illustrative server suitable for use in practicing an embodiment of the present invention. As shown in FIG. 2, the Web server 103 is connected to the network 101 (FIG. 1) via a network interface 160. Those of ordinary skill in the art will appreciate that the network interface 160 includes the necessary hardware and software for allowing the Web server 103 to communicate with other computers connected to the network by the use of one or more suitable communication protocols, such as the TCP/IP protocol.

The Web server 103 also includes a central processing unit (CPU) 162, a video display adapter 164, and mass memory 166, all connected together and to the network interface 160 by a bus 168. The mass memory 166 generally comprises RAM, ROM, and permanent mass memory, such as a hard disk drive, tape drive, optical drive, floppy disk drive, or combination thereof. The mass memory device 166 stores an operating system 170 for controlling the operation of the Web server 103. As is known to those of ordinary skill in the art, the operating system may be formed by a general-purpose server operating system such as a Microsoft® server operating system, UNIX or LINUX™. A binary input/output system ("BIOS") 188 for controlling the low-level operation of server 103 is also stored in the mass memory device 166.

The mass memory device 166 also stores the program code and data for providing a Web or other network site that allows users to request, receive, and view information and data files stored in the Web server 103. Thus, the mass memory device 166 may store a Web server application 178, which may be any one of a number of commercially available software packages. The Web server application 178 comprises computer executable instructions that, when executed by the server 103, generate configurable markup documents, such as the sample markup documents shown in FIG. 10 and described below. The Web server application 178 may be configured with a commercially available database search application 180 to facilitate the database search functions described below. The mass memory device 166 also stores other software components that facilitate various other functions of the present invention. More specifically, the software components for performing the methods of the present invention may be supported by or included as part of one or more commercially available software applications, such as a .NET® server 176. Although this illustration includes examples of specific software applications and databases, it is to be understood that this should be taken as exemplary and not limiting.

The Web server 103 may also include an input/output interface 190 connected to the bus 168 for communicating with external devices, such as a mouse, keyboard, scanner, or other input devices not shown in FIG. 2. Likewise, the Web server 103 may further include additional mass storage facilities, such as CD-ROM/DVD-ROM drive 192 and large capacity hard disk drive 194, also connected to the bus 168. The hard disk drive 194 may be utilized to store one or more databases. In particular, in an embodiment where the functions of the Web server 103 and the search server 104 are combined into one computer, the hard disk drive 194 may store a content database 198 for use by the search program 180 and Web server application 178. The content database 198, whether it is housed in the Web server 103 or the search server 104, is configured to store large volumes of featured content items. Details of one example content database that may be used with the system and method of the present invention is described below with reference to FIG. 3.

Client computers and devices 102A, 102B, 102C, 102D shown in FIG. 1, may take the form of any one of a number of different computer products. In addition to the examples described above, the client computer and devices also may be a server or a two-way pager. As will be appreciated by those of ordinary skill in the art or others, the architecture of the client computers and devices 102A, 102B, 102C, 102D may take on any suitable form, such as the computer architecture illustrated in FIG. 2, if appropriate. In any event, the client computers and devices 102A, 102B, 102C, 102D include a network interface for providing communication with the network 101. The network interface may be configured for use with any wired or wireless network connection, and may be used with any suitable communication protocol, such as the TCP/IP protocol. In general, each of the client computers and devices includes a processing unit, a display, and a memory unit. The memory unit stores the program code necessary for operating the client computer or device and for generating a graphical user interface (GUI) on the display of the client computer or device. For instance, individual client computers or devices may contain an operating system, such as one offered by Microsoft® Corporation.

As will be appreciated by those of ordinary skill in the art or others, some operating systems comprise a central hierarchical database referred to in the art as a system registry 173. The system registry 173 is used to store information necessary to configure settings of the computer for one or more users, applications, and hardware devices. The system registry 173 contains information that the operating system continually references during operation, such as profiles for each user, the applications installed on the computer and the types of documents each can create, property sheet settings for folders and application icons, what hardware exists on the computer, and which ports are being used. As will be described in more detail below, embodiments of the present invention utilize the system registry 173, or any other similarly configured database, to store featured content items.

When software applications formed in accordance with this invention are implemented in a computer network 100 of the type illustrated in FIG. 1, the invention provides a way for client computers and devices 102A, 102B, 102C, 102D to receive, store, and display featured content, i.e., updated messages, announcements, and/or other information that is related to a topic of interest. For example, when a software application formed in accordance with the present invention is installed on a client computer, the software application contains a fixed number of default content items that are displayed when the software application first executes. During execution, if connected to the network 101, the software application transmits a database query to the search server 104 to obtain new featured content items.

The query is configured with keywords or identifiers that are associated with a particular topic. For example, if the query contains the term "word" as one of the keywords, the search server 104 may return a data set having featured content items related to Microsoft® Word®. Upon receipt of the data set, the software application stores the featured content items in a cache file. A predetermined number of featured content items are then communicated from the cache file to the system registry of the client computer. In each subsequent boot of the software application, the newly acquired featured content items are displayed and additional featured content items are obtained from database queries to the search server. The above-described embodiment allows a client software application to obtain new featured content items without inhibiting the boot process of the calling software application.

Figure 3:
FIG. 3 is a table illustrating a representative section of a sample database of featured content items, which is used to illustrate embodiments of the present invention.

For purposes of illustrating the present invention, a sample database of featured content items is provided. The following description of the present invention includes specific references to this example database to illustrate embodiments of several display methods. A representative section of the example database 300 is shown in FIG. 3. This model may be used to electronically communicate featured content items to remote or local software applications and users.

Figure 11:
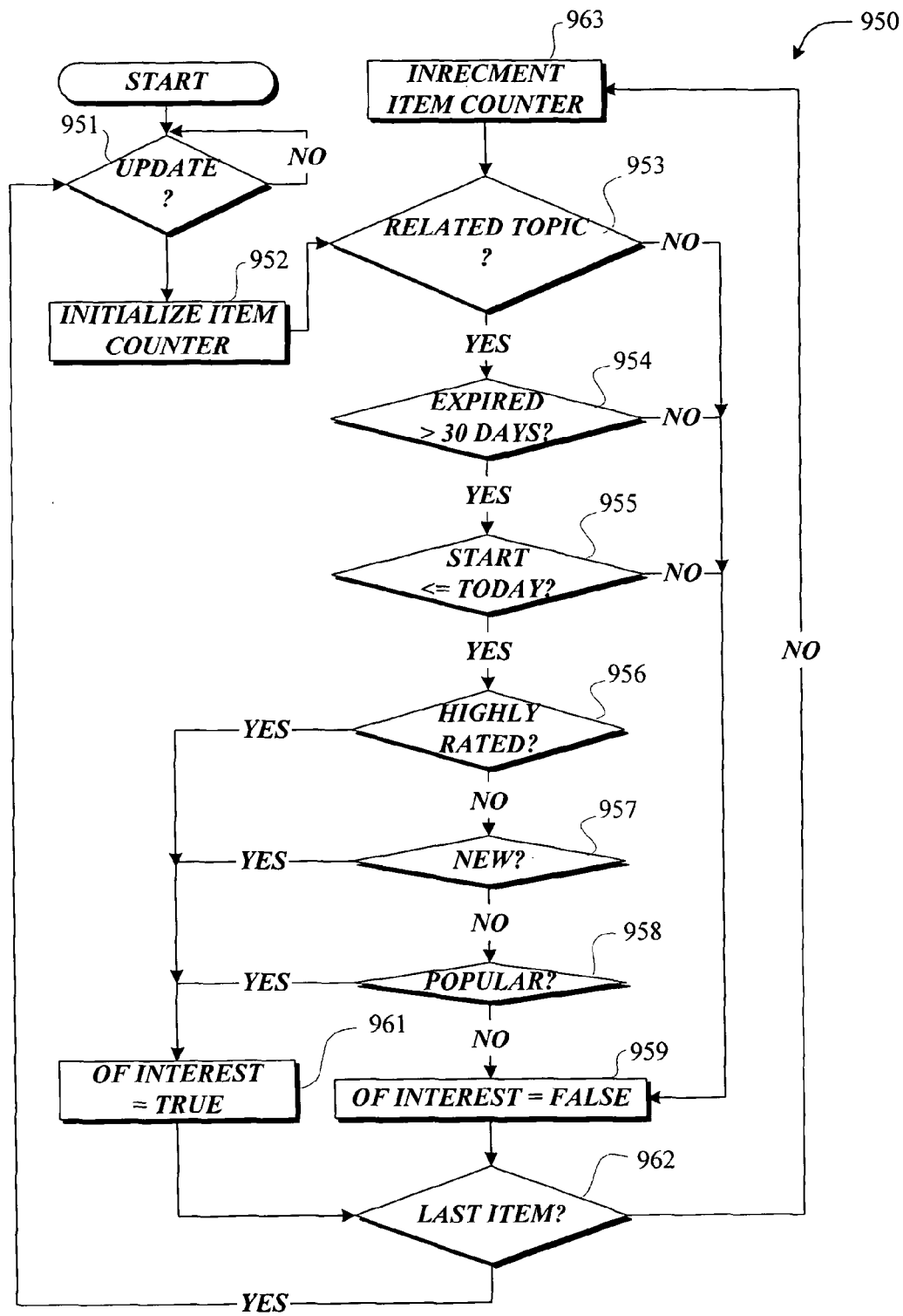
FIG. 11 is a flow diagram illustrating an exemplary embodiment of a method for updating individual featured content items according to the present invention.

As shown, the sample database 300 includes a number of featured content items each referenced with identification (ID) numbers: 1, 2, 3, 4, and 5. As summarized above, each featured content item may contain a message or information related to a specific topic. The message or information may be in any format, including text data, image data, hyperlink text data, markup document data, or computer code. In one exemplary embodiment, each featured content item is also associated with a number of database fields, which are listed as: ASSET ID, PRIORITY, UPDATED, CREATION, and OF INTEREST. The ASSET ID field contains keywords, metadata, or other types of identifiers that describe the topic of the item. The PRIORITY field contains a binary value to indicate if a particular item should have a high priority status. The UPDATE and CREATION fields respectively contain a last update time stamp and a creation time stamp. The OF INTEREST field contains a binary value to indicate if a particular item is of interest to particular users. As will be appreciated by those of ordinary skill in the art, binary values, unique identifiers, or other identifiers can be used in each database field to characterize and distinguish each featured content item. Although this example illustrates one database model having specific fields, those skilled in the art will appreciate that the present invention may operate with less than all of the listed fields. In addition, as will be described in more detail below with reference to FIG. 11, those skilled in the art will appreciate that other fields may be added to accommodate different types of applications.

Figure 4A:
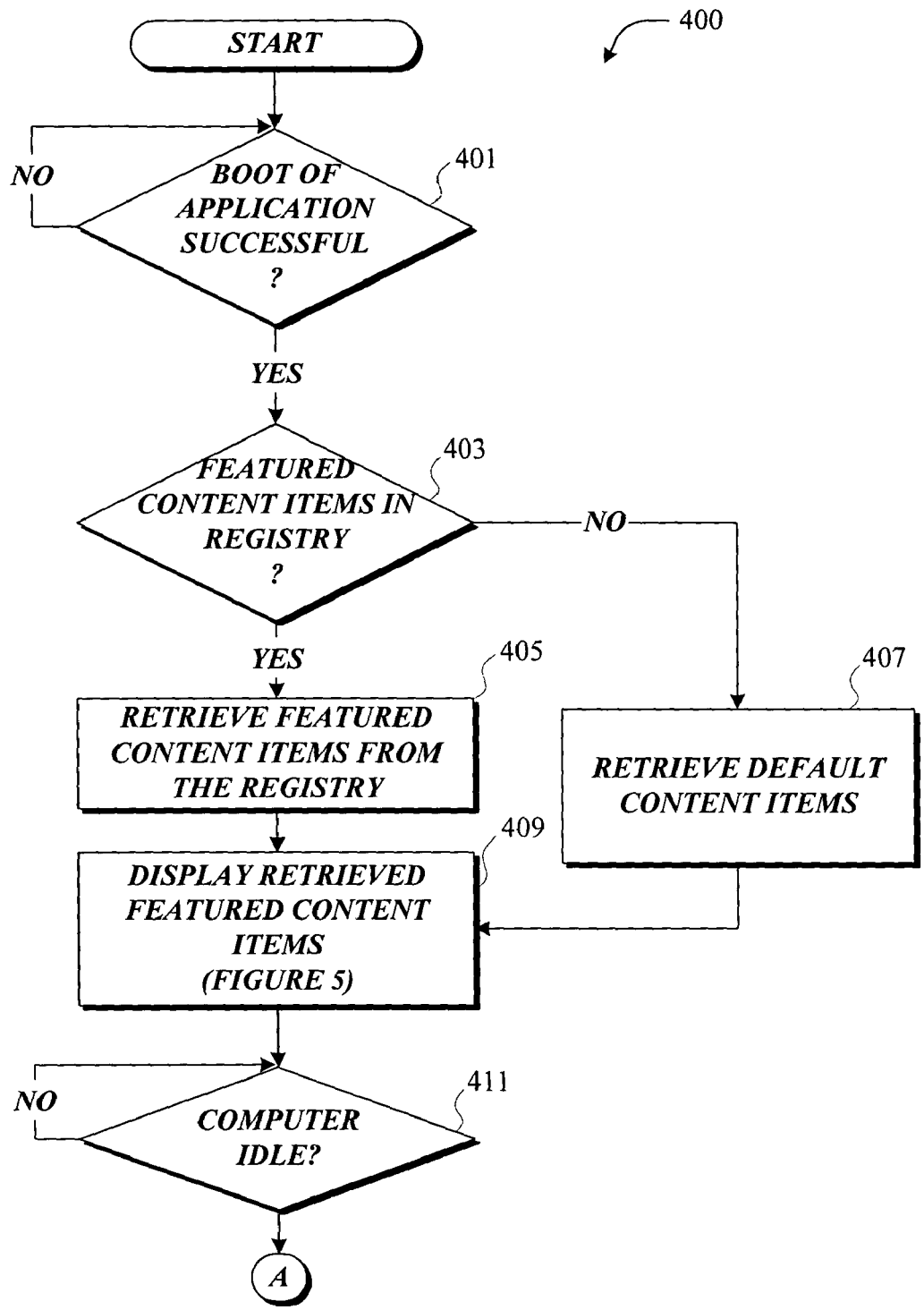
FIG. 4A is a flow diagram illustrating an exemplary embodiment of a method for displaying featured content items on a graphical user interface according to the present invention.
Figure 4B:
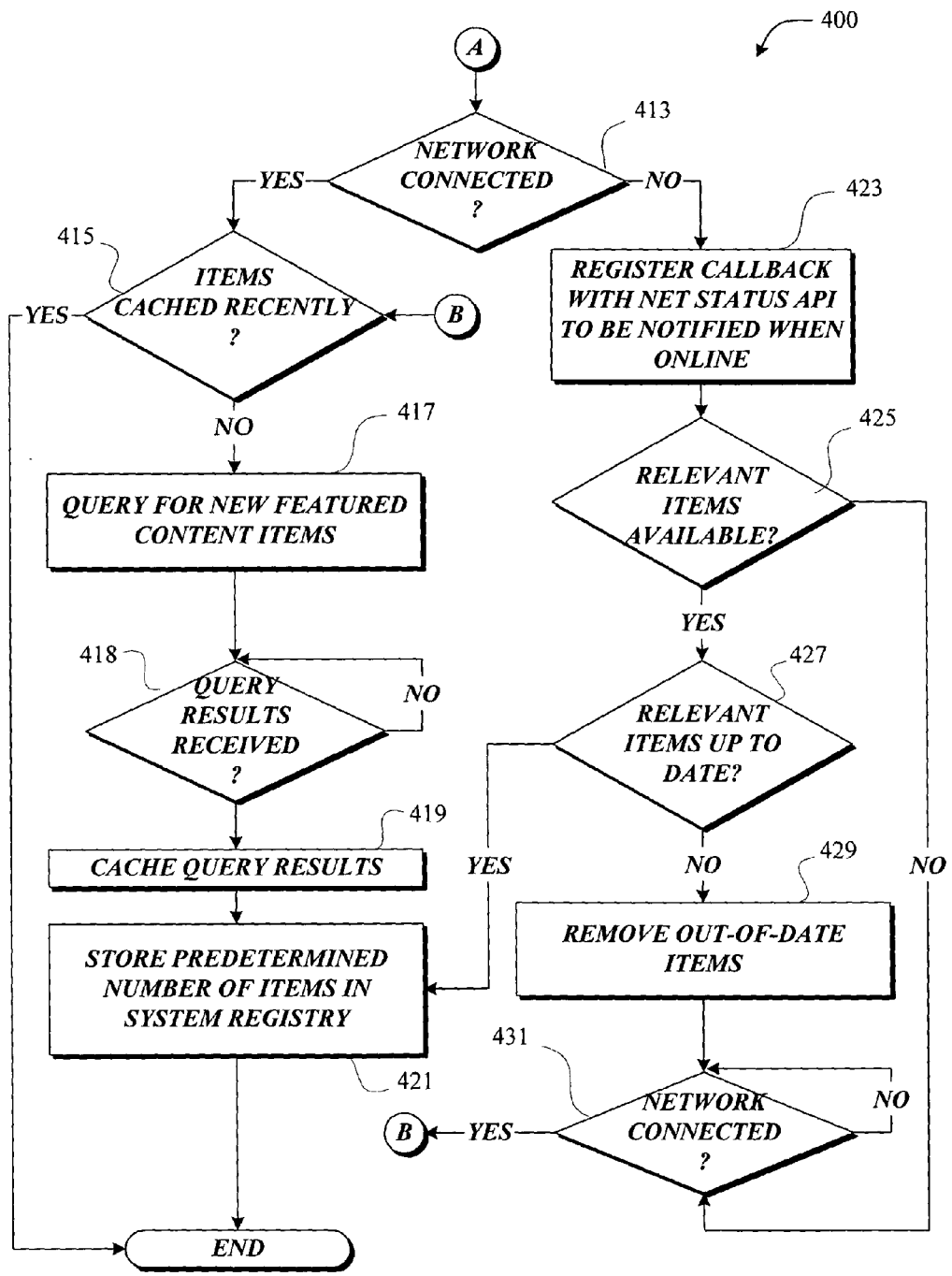
FIG. 4B is a continuation of the flow diagram illustrated in FIG. 4A that specifically illustrates an exemplary embodiment of a method for retrieving and storing featured content items according to the present invention.

Referring now to the block flow diagrams of FIGS. 4A and 4B and the pictorial diagrams of FIGS. 5, 6, and 7, one embodiment of an exemplary content processing method 400 will now be described. In summary, the method described below displays featured content items stored in the system registry of a computer or device. The method obtains new featured content items from a remote database and stores the new featured content items in the system registry. The new featured content items are then displayed upon receipt of a command to display one or more featured content items. For example, a command to display one or more featured content items may be invoked during the boot process of a software application or upon the receipt of a user-invoked command.

The following description illustrates one example of a method implemented in a software application that is executed on a client computer, such as the computers or devices 102A, 102B, 102C, 102D. The example client computer is in communication with a server, such as the search server 104. The content processing method 400 begins at decision block 401, where the method waits for a successful boot of the software application. In the process of decision block 401, the software application is configured to generate a signal indicating a successful boot once the boot process reaches a predetermined state. For example, a successful boot may be determined once all application files have been properly accessed. Once the method determines that the software application has successfully booted, the content processing method 400 proceeds to decision block 403 where the method determines if there is at least one featured content item stored in the system registry.

If, at decision block 403, the method determines that the system registry does not contain at least one featured content item, the content processing method 400 proceeds to block 407 where the method retrieves default content items. In the process of block 407, the method retrieves one or more featured items stored in a file associated with the software application. To facilitate the process of block 407, default content items are preferably stored in an application file during the release of the software application. This configuration allows the software application to display standard messages when the system registry cannot be accessed. This configuration also allows the software application to display standard messages if the system registry does not contain any featured content items. As will be described in more detail below, the featured content items are written to the system registry in subsequent steps of the content processing method 400. Thus, featured content items are not likely to be displayed during the first execution of the content processing method 400.

At decision block 403, if it is determined that the system registry contains at least one featured content item, the method proceeds to block 405 where the method retrieves the featured content items from the system registry. As will be appreciated by those of ordinary skill in the art, the process of block 405 can be carried out by one of a number of known methods for retrieving data from a system registry. In one preferred embodiment, the process of block 405 retrieves all of the featured content items associated with the software application. For example, if the content processing method 400 is implemented in a software application such as Microsoft Word®, the method would retrieve all featured content items associated with the Word® registry records.

After the execution of the process of block 405 or block 407, the content processing method 400 continues at block 409 where the method displays the retrieved featured content items or default items on a graphical user interface. In the process of block 409 the data of the retrieved featured content items or default items is displayed on a graphical user interface associated with the application. The display of the retrieved items may be in a standalone window or it may be integrated in the main window of the software application. A sample of one graphical user interface generated from the process of block 409 is shown in FIG. 5.

Figure 5:
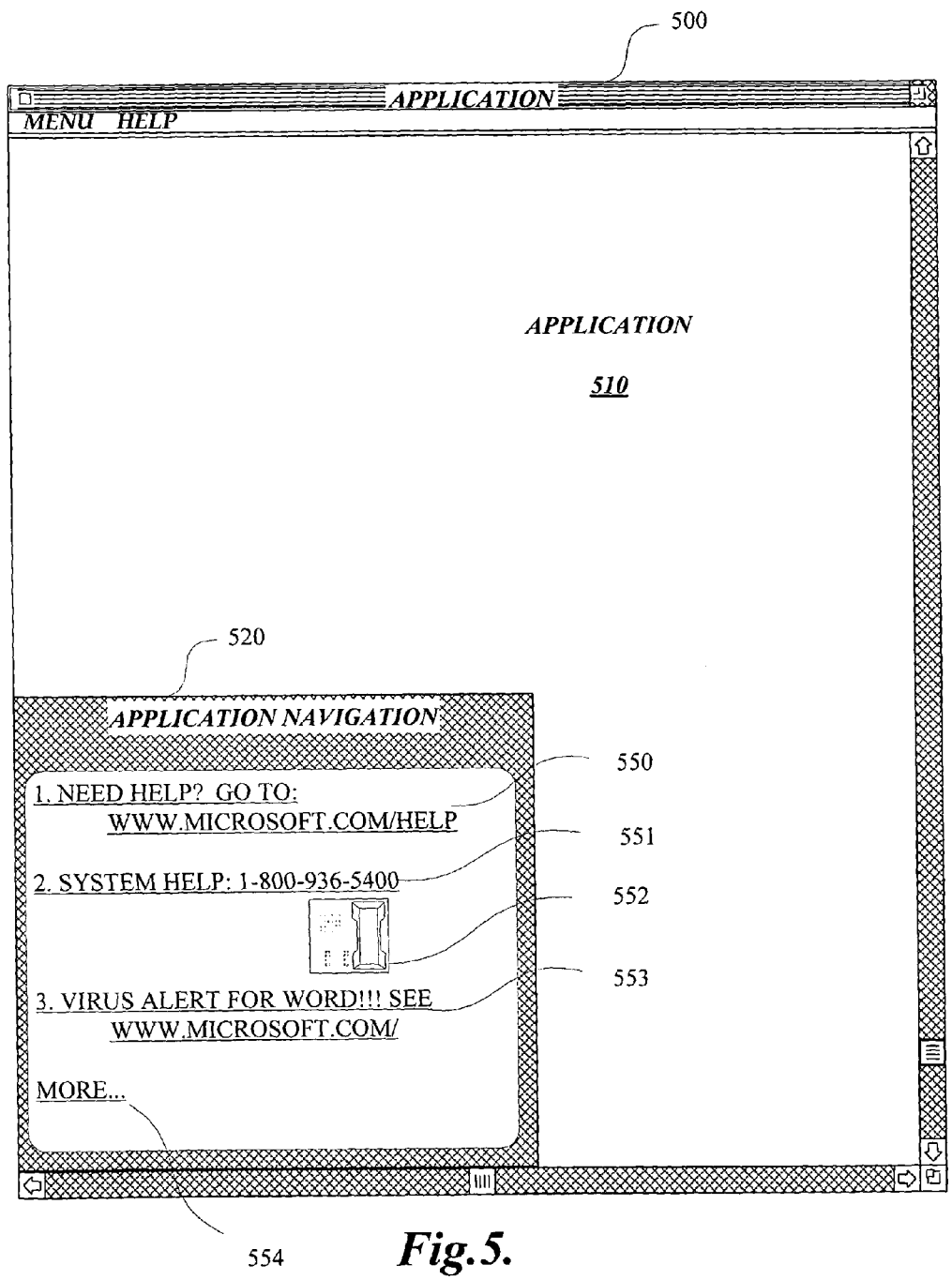
FIG. 5 is a pictorial diagram illustrating one exemplary graphical user interface according to the present invention for displaying a dynamically updated list of featured content items.
Figure 6:
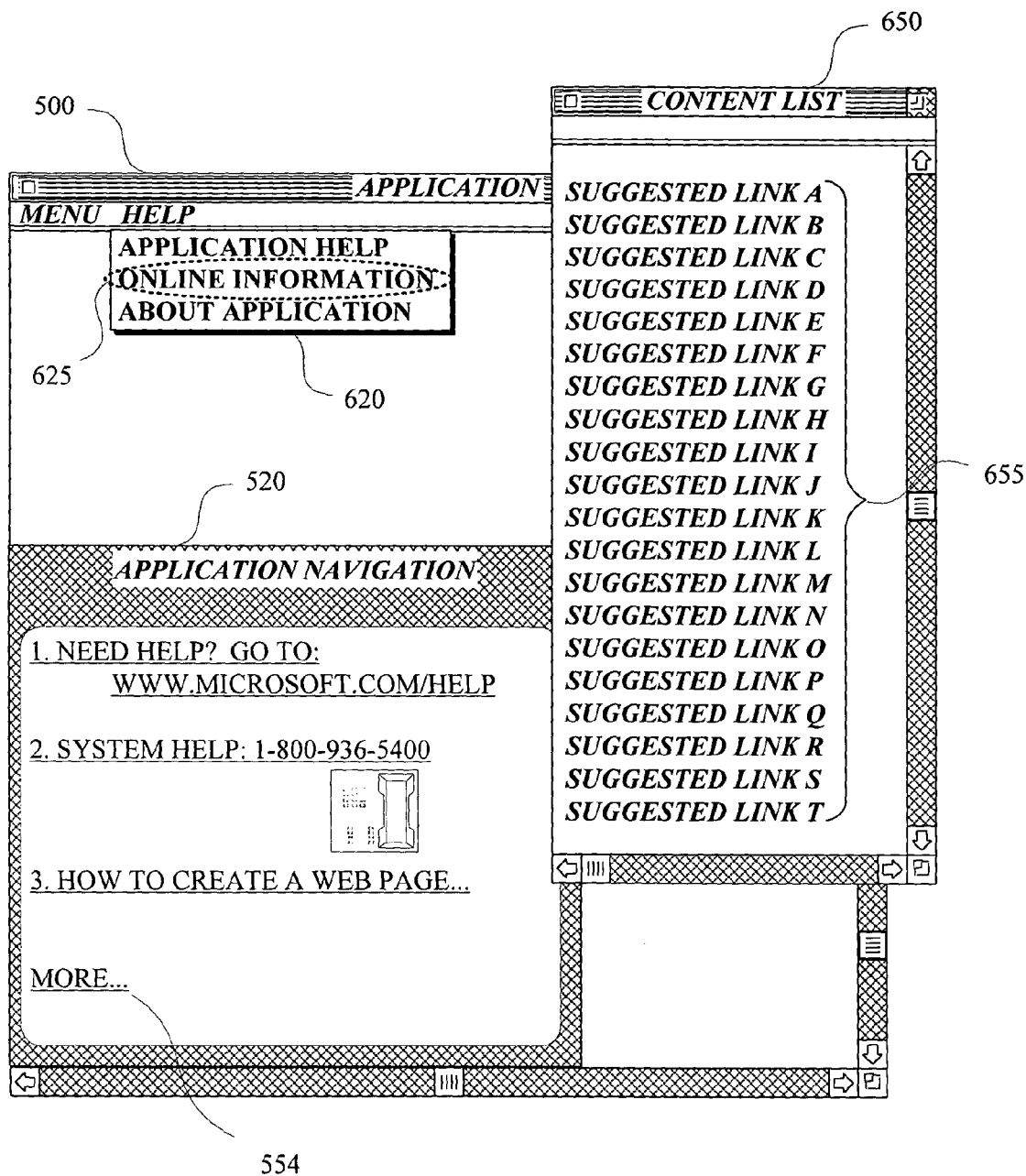
FIG. 6 is a pictorial diagram illustrating another exemplary graphical user interface according to the present invention for displaying an extended list of featured content items.

FIG. 5 is one example of a graphical user interface, also referred to as an application interface 500, suitable for displaying one or more featured content items. With reference to the above-described example, the application interface 500 may display the featured items obtained from the computer registry or one or more default content items. In this exemplary embodiment, the application interface 500 includes an application section 510, which displays the general content of software application, and a spotlight section 520 for displaying and distinguishing the featured content items.

As shown in FIG. 5, the spotlight section 520 comprises a plurality of featured content items 550-552. As shown in this example, the featured content items may be in the form of a number of data formats. The first featured content item 550 includes a text message that displays a uniform resource locator (URL). In this example, the first featured content item 550 is also configured to function as a selectable hyperlink. The second featured content item 551 includes a text message communicating a telephone number. In this example, the second featured content item 551 also contains image data that is configured to display an icon 552. The third featured content item 551 includes a general text message, which is also associated with hidden URL data, so the item is configured to function as a selectable hyperlink. The example featured content items shown in FIG. 5 correlate to the example content database of FIG. 3. In this example, the items having an ASSET ID of "word" are selected as the three items displayed on the application interface 500.

The spotlight section 520 also comprises a selectable link 554 that enables a user to view additional featured content items. In a preferred embodiment, a user selection of the selectable link 554 displays a complete list of the featured content items stored in the client computer. FIG. 6 illustrates one example of a graphical user interface, also referred to as a list interface 650, suitable for displaying a list 655 of featured content items stored in a local cache file and/or the system registry. Also shown in FIG. 6, the application interface 500 also comprises a pull-down menu 620 having a selectable menu item 625 for invoking the display of the list interface 650.

Returning now to FIG. 4A, upon the execution of process block 409, the content processing method 400 proceeds to decision block 411 where the method waits for an idle state of the client computer. In an exemplary embodiment, the method determines that the client computer is at an idle state when the method receives a signal from the CPU, indicating that the CPU has a free processing cycle. When the method detects an idle state of the client computer, the content processing method 400 continues to decision block 413 (FIG. 4B), where the method determines if the client computer is connected to a network, such as the Internet.

In the process of block 413, the content processing method 400 determines if the computer is connected to a network by checking the status of a network application program interface (API). As will be appreciated by those of ordinary skill in the art or others, a standard network API may be used to facilitate the processing of decision block 413. If, at decision block 413, it is determined that the computer is connected to a network, the content processing method 400 proceeds to decision block 415 where the method determines if featured content items have been recently cached in a local cache file. In one exemplary embodiment, the method may determine that featured content items have been recently cached if featured content items have been written to the cache file within a predetermined period of time. In one specific embodiment, the method determines that the items have been recently cached if an item has been written to the cache file within the past thirty (30) days. Although a period of thirty (30) days is used to illustrate one example, those of ordinary skill in the art will appreciate that any other time period can be used in the process of decision block 415. If, at decision block 415, the method determines that the items have been cached recently, the content processing method 400 terminates.

If, at decision block 415, it is determined that no featured content items have been cached recently, the content processing method 400 proceeds to block 417 where the method queries a database to obtain a new or updated set of featured content items. In the process of block 417, the database query may be communicated from the client computer to a server storing a database of featured content items. The query preferably includes one or more keywords, referred to herein as ASSET IDs, to associate the query with a topic of interest. In one embodiment, the ASSET ID may be set to the name of a software application or other keywords that identify the functions of the software application. For instance, in the example using Microsoft Outlook or Microsoft Word®, the ASSET ID may be respectively assigned the keywords "outlook" or "word." Although this example utilizes keywords to associate database queries with a topic of interest, those of ordinary skill in the art will appreciate that the ASSET ID may include other types of identifiers in any data format to associate a query with a particular topic.

Next, as shown in decision block 418, the method waits for the receipt of the database query results. In an exemplary embodiment, the query results may be communicated from the server to the client computer. At decision block 418, once it is determined that a query result has been received, the method proceeds to block 419 where the method caches the query results in a memory device of the client computer. In an exemplary embodiment, the process of block 419 may cache the query results in a cache file on a hard drive. In this part of the process, the query results may be stored in the cache file in one of a number of data formats. For instance, the query results may be communicated and stored in an extensible markup language (XML) file. Although this example utilizes one embodiment where a cache file is used to cache the received query results, any other file type, memory device, and/or storage format may be used to cache the query results.

Upon the storage of the query results in process block 419, the method continues to block 421, where the method stores a predetermined number of featured content items in the system registry. In one exemplary embodiment, the content processing method 400 randomly selects three (3) featured content items stored in the cache file. The randomly selected featured content items are then stored in the system registry. In this process, standard operating system registry procedures may be used to store the data of the selected featured content items. Although this example illustrates one embodiment where three (3) featured content items are stored in the system registry, the scope of the present invention encompasses any method that selects any number of featured content items. Upon the execution of block 421, the content processing method 400 terminates.

Returning now to decision block 413, if the method determines that the client computer is not connected to a network, the method proceeds to block 423 where the method registers a call back request with a network status API. In this part of the process, a call back request is established with a network status API so that the method of the present invention may be notified when the network status API determines that the client computer is connected to a network. Any standard network status API that is compatible with the operating system of the client computer may be used to implement the process of block 413.

Next, at decision block 425, the method determines if there are featured content items stored in the cache file. As described above with reference to process block 419, the present invention writes featured content items in a locally stored cache file when query results are received from the server. In examining the locally stored cache file, the process of block 425 utilizes known operating system code resources to determine if the locally stored cache file exists. If the cache file exists, then the condition of decision block 425 is met, and the content processing method 400 proceeds to decision block 427 where the method determines if at least one relevant item is up to date. In one exemplary embodiment, the method examines a time stamp of each featured content item having an ASSET ID that matches a particular keyword or identifier. For instance, with reference to the above example, the process of decision block 427 may perform an examination of a time stamp of each featured content item storing the term "word" in the ASSET ID field to determine if the items are up to date. In one specific embodiment, the method determines that a relevant item is up to date if the item has been written to the cache file, i.e., the item has been updated, within the past thirty (30) days. Although a period of thirty (30) days is used to illustrate one example, those of ordinary skill in the art will appreciate that any other time period can be used in the process of decision block 427.

In other embodiments, the process of decision block 427 may examine one of many other time stamps associated with each featured content item. For example, the process may examine the creation date time stamp, the last update time stamp or another time stamp that indicates the time at which the item was stored. If, at decision block 427, the method determines that there is at least one relevant item that is up to date, the content processing method 400 continues at block 421, where the up-to-date items of the cache file are stored in the system registry. The process of block 421 randomly selects the up-to-date, relevant featured content items, and stores the randomly selected items in the system registry. Alternatively, at decision block 427, if it is determined that the cache file does not contain relevant items that are up to date, the method proceeds to block 429 where the method removes the items that are not up to date. Thus, using the above example, the method deletes all featured content items that were stored in the cache file for a period longer thirty (30) days.

Upon the processing of block 429, or if it is determined, at decision block 425, that there are no featured content items stored in the cache file, the content processing method 400 proceeds to decision block 431 where the method determines if the client computer has established a connection with the network. As described above with respect to block 423, the method registered a call back request with the network status API. Generally described, the block 431 sets the client computer in a state that allows it to wait for a response from the network status API, which indicates that a connection has been established between the network and client computer. As will be appreciated by those of ordinary skill in the art, the process of decision block 431 may remain in a wait state until a signal is received from the network status API, or until the software application implementing the method is terminated. At decision block 431, once it is determined that the client computer has established a connection with the network, the method continues to decision block 415 where the method determines if featured content items have been recently cached in the cache file. From this point, the content processing method 400 proceeds through blocks 417-421 as described above. Alternatively, the method terminates if the application is terminated at block 431 or if, at decision block 415, it is determined that the items were recently cached.

As described above, the content processing method 400 allows for the retrieval and efficient display of new content items during the boot process of a software application. The content processing method 400 also provides default content items which allow for execution of the method before featured content items are written to the system registry. The method attempts to retrieve new content items from a content database during each execution. In addition, in each execution of the method, new featured content items are read from the system registry and displayed. As a result, software applications are able to display new messages, announcements or other information, without inhibiting the efficiency of the boot process.

The content processing method 400 can be used to display featured content items in any format. In addition, the featured content items may be displayed on any graphical user interface or other display suitable for communicating a message. In addition, each featured content item may be displayed with other functional components of an interface to provide specific user instructions. For example, featured content items of the present invention may be positioned in a graphical user interface to provide users with some guidance as to how to conduct a search for additional information. A sample of one graphical user interface illustrating this aspect of the invention is shown in FIG. 7.

Figure 7:
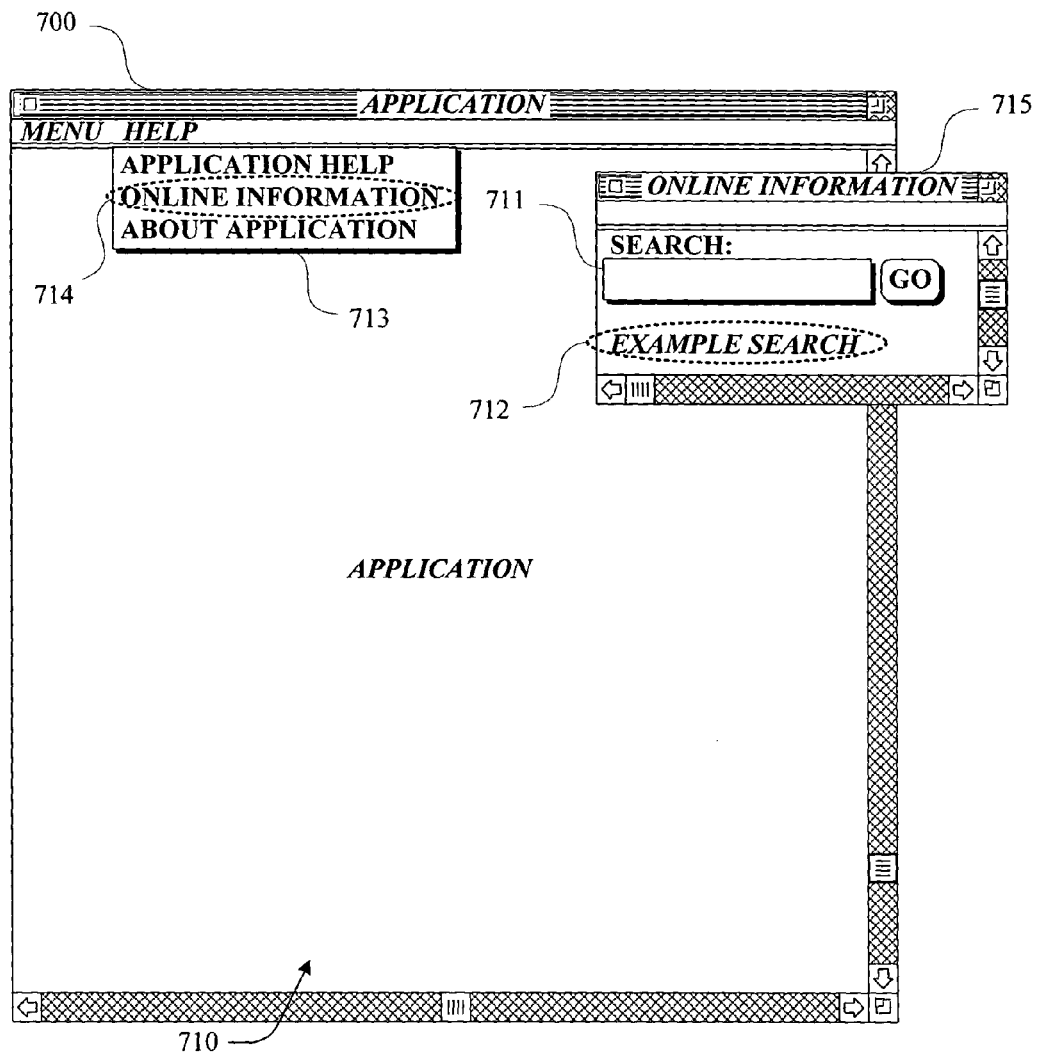
FIG. 7 is a pictorial diagram illustrating yet another exemplary graphical user interface according to the present invention for displaying a featured content item that functions as a sample search string.

FIG. 7 illustrates one example of a graphical user interface, also referred to as a search interface 700, suitable for displaying a featured content item as a user instruction. As shown, the search interface 700 includes an application section 710 and a standard pull-down menu 713. The pull-down menu 713 contains a menu option 714 which is entitled "Online Information." Upon selection of the menu option 714, a separate search window 715 is generated. Also shown in FIG. 7, the search window 715 comprises a text input field 711 and at least one featured content item 712 for providing an example of how to operate a search function of the application. In this example, the featured content item 712 may display an example search string, which may guide a user to search for a new topic. By use of this embodiment, sample search strings are less likely to become stale over time.

In another embodiment, the present invention provides a system and method for displaying featured content items on a Web page. Generally described, this embodiment automatically integrates featured content items into a Web page so the underlying code of the Web page does not have to be manually updated to integrate modifications of the featured content. In one specific embodiment, an ASSET ID is included in a Web page request. When the Web page request is received by a Web server, the ASSET ID is sent to a database search application. The database search application obtains the query and returns a data set of featured content items for integration of the featured content items into a Web page.

Figure 8:
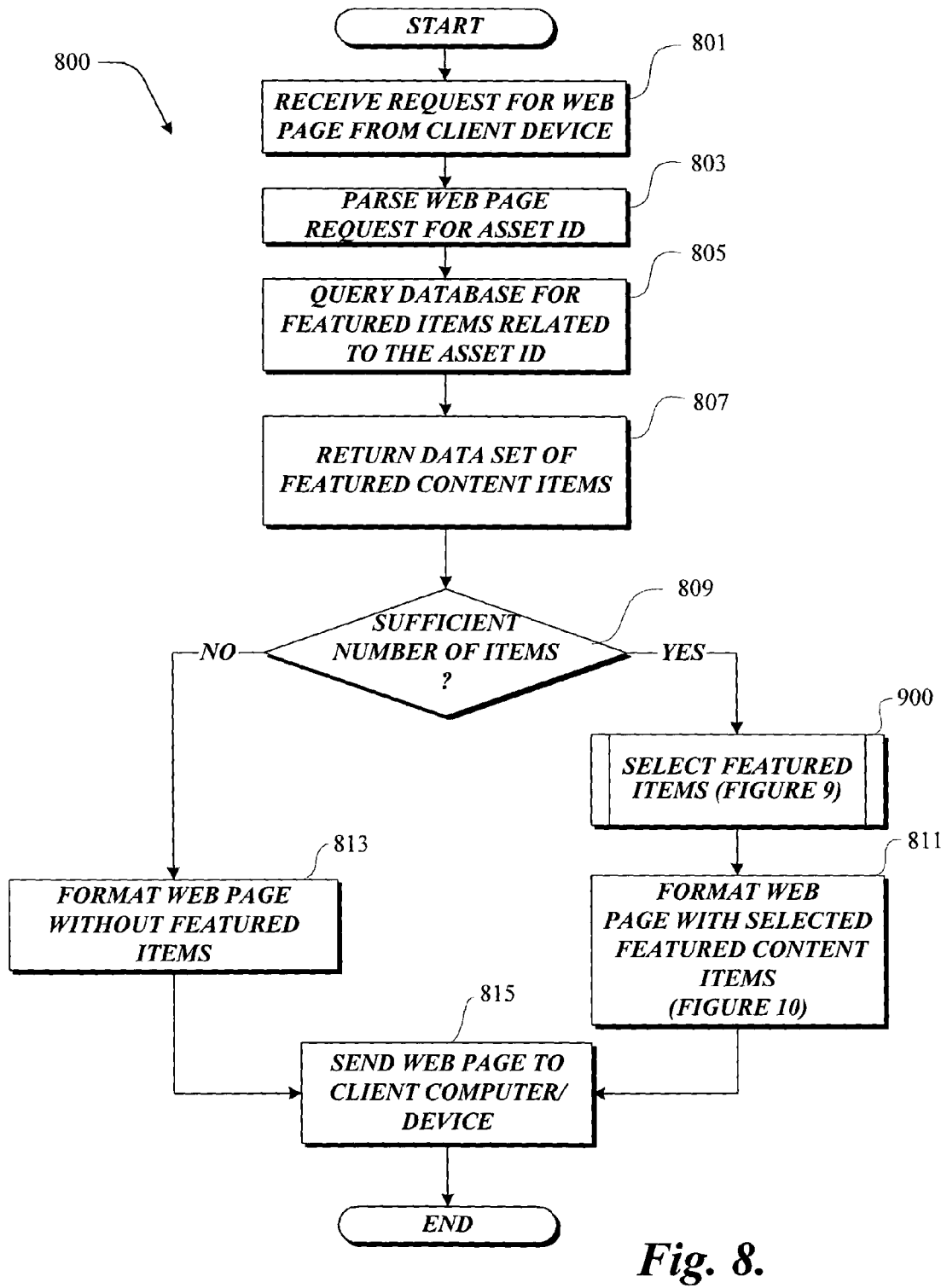
FIG. 8 is a flow diagram illustrating an exemplary embodiment of a method for retrieving and displaying featured content items for display on a Web page according to the present invention.
Figure 9:
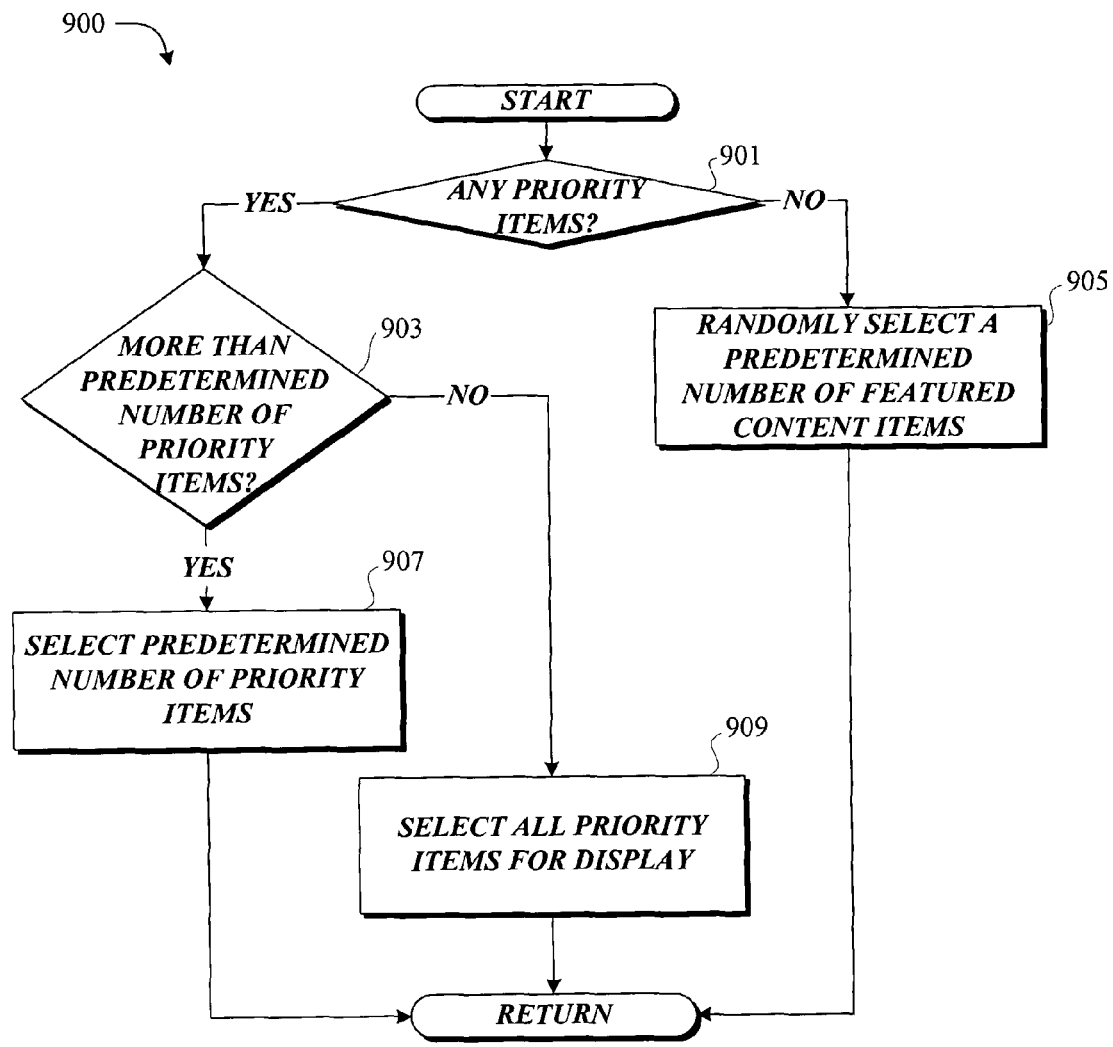
FIG. 9 is a flow diagram illustrating an exemplary embodiment of a method for selecting individual featured content items from a data set of featured content items, the method suitable for use in the method depicted in FIG. 8.

With reference to the block flow diagrams of FIGS. 8 and 9 and the pictorial diagram of FIG. 10, one embodiment of a content retrieval method 800 will now be described. The content retrieval method 800 begins at decision block 801 where the method receives a request for a Web page. In this part of the process, a user may invoke a request for a Web page by the use of a commercially available Web browser or other software application capable of generating a Web page request. In an example implementation of the present invention, the Web page request is sent from a client computer or device, such as the computers or devices 102A, 102B, 102C, 102D of FIG. 1, to a Web server 103. In this part of the process, the Web page request is configured with an ASSET ID, which is used to describe the content requested by the user. Similar to the above-described examples, the ASSET ID may contain a keyword or identifier, such as "word," "outlook," etc.

Upon receipt of the Web page request, the method proceeds to block 803 where the Web server parses the Web page request to obtain the ASSET ID contained in the request. As will be appreciated by those of ordinary skill in the art, this part of the process extracts all keywords and identifiers that are labeled as an ASSET ID. The parsing method may be done by a number of known character and/or metadata filtering methods.

After the ASSET ID has been parsed from the Web page request, the method proceeds to block 805 where the Web server queries a database for featured items related to the ASSET ID. In this part of the process, the Web server communicates the obtained ASSET ID to a server, such as the search server (104) (of FIG. 1) by the use of a suitable database query. In response to the query, a data set of featured content items is returned from the search server.

Next, as shown in decision block 809, the method determines if the data set contains a sufficient number of featured content items. This feature allows the method to appropriately format a Web page, depending on the results of the database query. In one exemplary embodiment, the method determines that there is a sufficient number of featured content items if the data set contains at least three (3) items. If, at decision block 809, it is determined that there is not a sufficient number of featured items, the method proceeds to block 813 where the method formats a Web page without including the data of the featured content items.

If, at decision block 809, it is determined that there is a sufficient number of featured items, the method proceeds to block 900 where the method selects featured content items from the data set. The process block 900 is described in more detail below with reference to FIG. 9. After the selection process of block 900, the method proceeds to block 811 where the method formats the Web page with the selected featured content items. A sample of a Web page that is formatted in accordance with one embodiment of the present invention is described in more detail below with respect to FIG. 10. Upon the processing of block 813 or 811, the method proceeds to block 815 where the generated Web page is sent to the client computer from the Web server. After the processing of block 815, the content retrieval method 800 terminates.

Referring now to the block flow diagram of FIG. 9, an exemplary embodiment of a method for selecting items for display, hereinafter referred to as the selection method (block 900 of FIG. 8), is shown and described below. Generally described, the selection method 900 examines the featured content items of a received data set of featured content items and determines if any one of the featured content items is categorized as a priority item. As noted above with respect to FIG. 3, each featured content item stores a priority value in a database field to indicate if it has a priority status. In brief, the selection method of FIG. 9 examines the priority value to determine if a particular item should be displayed.

The selection method 900 begins at block 901 where the method determines if any one of the items of the data set contains a priority status. In this part of the process, an examination may be performed on the PRIORITY field of each featured content item to determine if the condition of decision block 901 has been met. If, at decision block 901, it is determined that none of the items stored in the data set contain a priority status, the method proceeds to block 905 where the method randomly selects a predetermined number of featured content items for display. In the process of block 905, the method may select two (2) or three (3) featured content items for display. Although this example illustrates one embodiment where the method randomly selects two (2) or three (3) items for display, any other number of items may be selected to accommodate the size and format of the Web page that is to display the selected featured content items.

In an alternative embodiment, the processing of block 905 may randomly select two (2) or three (3) items having certain database attributes. For instance, with reference to FIG. 3, the method may only select items having a TRUE value stored in the OF INTEREST field. In this alternative embodiment, the OF INTEREST field, or any other database attribute, may be used to further distinguish featured content items for display.

If, at decision block 901, it is determined that there is at least one priority item in the data set, the method proceeds to decision block 903 where the method determines if there is more than a predetermined number of priority items. In one exemplary embodiment, the method determines that there are more than a predetermined number of priority items if there are more than two (2) priority items. Although this example illustrates one embodiment where the predetermined number of priority items is set at two (2), the predetermined number utilized in process block 903 may be set to any other number depending on the needs of the application. For instance, the predetermined number of priority items may be more than two (2) if the display region of Web page can accommodate more than two (2) featured content items.

If, at decision block 903, it is determined that there are more than a predetermined number of priority items, the method proceeds to block 907, where the method selects a predetermined number of priority items for display. In the process of block 907, it is preferred that the method select the two (2) newest priority items of the data set. In one embodiment, the process of block 907 examines the creation date of the priority items of the data set and selects two (2) items having the latest creation date. Although this example illustrates one embodiment where the creation date is examined, other time stamps, such as the update time stamp, may be used for the process of block 907.

If, at decision block 903, the method determines that the number of priority items does not exceed the predetermined number, the method proceeds to block 909, where the method selects all of the priority items for display. Upon the processing of blocks 907, 909, or 905, the selection method 900 terminates and returns to the calling method, which in this example is the content retrieval method 800. As described above, the content retrieval method 800 then displays the featured content items that are selected in the selection method 900.

Figure 10:
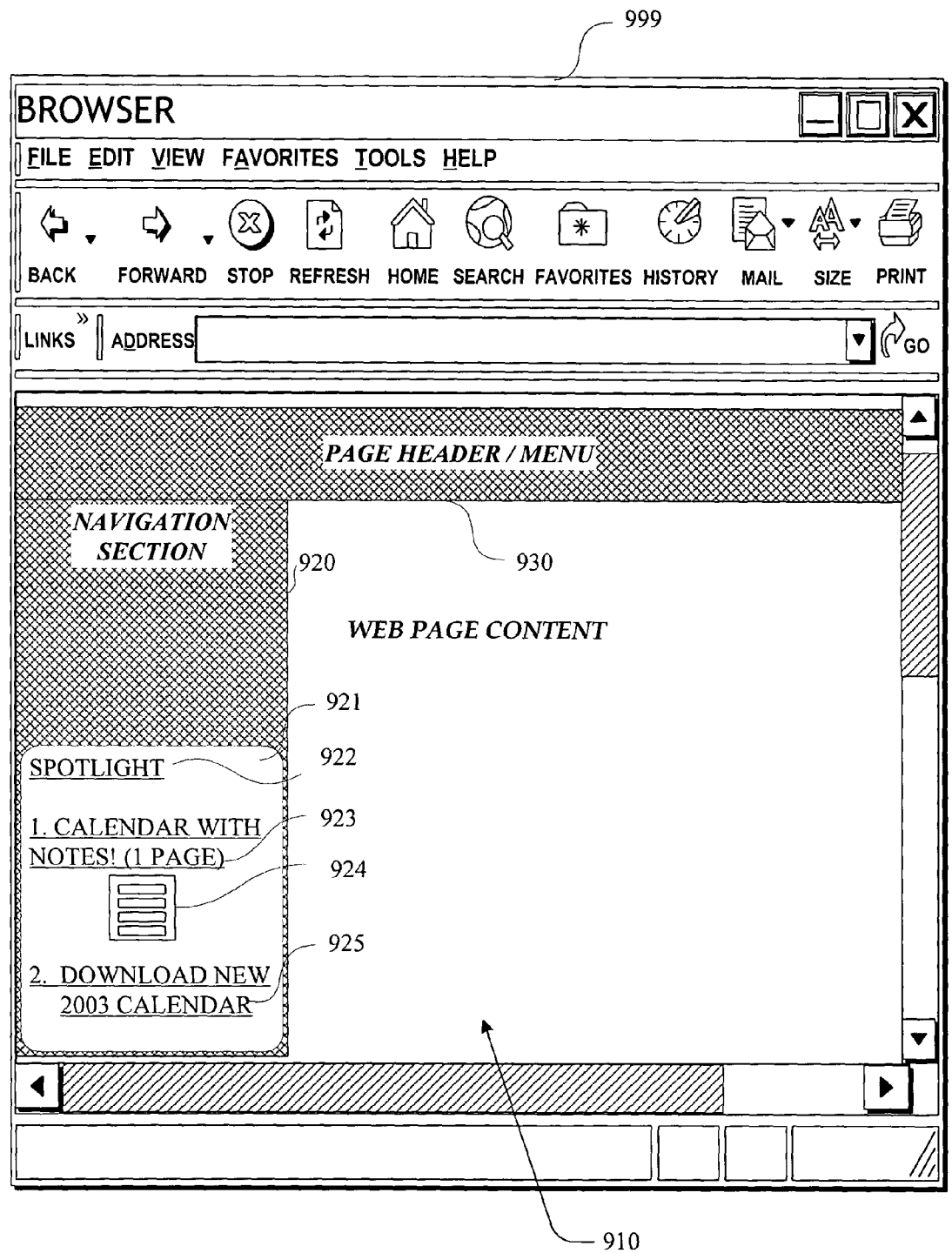
FIG. 10 is a pictorial diagram illustrating an exemplary graphical user interface according to the present invention for displaying featured content items on a Web page, an embodiment generated by the method depicted in FIG. 8.

FIG. 10 illustrates one example of a formatted Web page formed in accordance with one embodiment of block 811. As shown in FIG. 10, the Web page 999 includes a Web page content section 910, a header section 930, a navigation section 920, and a spotlight section 921. The spotlight section 921 includes a title 922 that describes and brings focus to the featured content items. In addition, spotlight section 921 displays the featured content items that were selected in the process of block 900. As shown, the first featured content item includes a text message 923 and an icon 924. The second featured content item includes a text message 925. Each featured content item may be configured with a number of components and functions, which may include underlying markup language that allows the item to function as a selectable hyperlink. Although the Web page 999 of FIG. 10 illustrates one format having various navigation and header sections, other Web page formats having more or less format features fall within the scope of the present invention.

As summarized above, another aspect of the present invention provides a method and system for dynamically updating featured content items stored in a database. This aspect of the invention provides an automated mechanism for updating featured content items so that the above-described embodiments can readily obtain and display messages that are of interest to users. In an exemplary embodiment, the update method is executed for each individual topic. For example, as described below, the update method may be executed for all items having a particular ASSET ID, e.g., an ASSET ID of "word." With reference to the example database 300 of FIG. 3 and the flow diagram of FIG. 11, one exemplary method of a database update method 950 will now be described.

The database update method 950 begins at decision block 951 where the method determines if the database should be updated. The processing of decision block 951 allows the database update method 950 to run on a periodic schedule, i.e., hourly, daily, weekly, etc. For example, if the update method 950 is configured to execute every sixty (60) minutes, the process of decision block 951 would examine a timing device and continue processing at block 952 after an hour has elapsed since the last execution of the update method 950. Although this example illustrates one embodiment where the method waits for a period of time, the method may be invoked by a number of user commands or may be randomly executed upon the completion of other processes.

Upon the continuation of the processing at decision block 951, the method continues at block 952 where an item counter is initialized. Since the method preferably examines all items in a database, an item counter may be established to indicate a current item being processed. In this example, the process of block 952 sets a reference pointer to the first item in a database of featured content items. In using the sample database 300 of FIG. 3, the process of block 952 would set a reference pointer to the item referenced as "ID 1."

The update method 950 continues at decision block 953 where the method determines if the current item contains a message or link that is related to a topic. For instance, if the ASSET ID contains the term "word," the process of decision block 953 examines the text message of the item to determine if the message is related to a related program, such as Microsoft Word®. In this part of the process, the method can search for keywords, patterns of keywords or other identifiers in the message to see if the message describes a related topic. If it is determined that the current item does not describe a related topic, the method proceeds to block 959 where the method updates the OF INTEREST field with a FALSE value.

If, at decision block 953, it is determined that the current item describes a related topic, the method continues at decision block 954 where the method determines if the current item has expired. In one exemplary embodiment, the method examines the creation date of the current item and determines that it has expired if a predetermined time period has elapsed since the creation date. In one embodiment, an item is deemed to be expired if a time period of thirty (30) days has elapsed since the creation date of the item. If, at decision block 954, it is determined that an item has expired, processing continues to block 959 where the current item is marked with a FALSE setting in the OF INTEREST field.

Alternatively, at decision block 954, if it is determined that the item has not expired, the method proceeds to block 955 where the method determines if a start time of the record has passed. In one embodiment of the present invention, each item may be configured with a START TIME field, which is not depicted in FIG. 3, indicating a date at which the record may be released for distribution. This feature is beneficial in situations where featured content may only be relevant to a particular item after a particular release date, such as an announcement describing a new version of Word®. In one exemplary embodiment, the processing of decision block 955 examines the time stamp stored in the START TIME field, and compares the time stamp to a computer clock. If it is determined that the start date has not passed, the method proceeds to block 959 where the current record is marked with a FALSE reading in the OF INTEREST field.

If it is determined that the start date has passed, the method continues to decision block 956 where the method determines if the current item has been highly rated. In one embodiment of the present invention, each item may be configured with a RATED field indicating a user rating of each item. As can be appreciated by those of ordinary skill in the art, the RATED field of an item may be manually updated by a user or it may be updated by a computer system that receives rating information for each item. Thus, in this embodiment, the processing of block 956 examines the RATED field to determine if the item is highly rated. If the RATED field indicates that an item is highly rated, the update method 950 proceeds to block 961 where the OF INTEREST field is updated with a TRUE value.

If, at decision block 956, it is determined that the current item is not highly rated, the method continues to decision block 957 where the method determines if the record is new. In one exemplary embodiment, the processing of decision block 957 examines the creation date of the item to determine if it is new. More specifically, an item is not deemed to be a new item if a predetermined time period, such as a period of one week, has elapsed since the creation date of the current item. If the predetermined time period has not elapsed since the creation date of the item, the item is considered to be new and the update method 950 proceeds to block 961 where the OF INTEREST field is updated with a TRUE value.

If, at decision block 957, it is determined that the current item is not new, the method continues to decision block 958 where the method determines if the record is considered to be popular. In one embodiment of the present invention, each item may be configured with a POPULAR field indicating the number of times an item has been displayed. As can be appreciated by those of ordinary skill in the art, known computer software applications or other manual processes may be used to maintain the number of times an item has been accessed or displayed to users. By examining the POPULAR field, which may be updated by an external system, the method determines that an item is popular if it has been displayed more than a predetermined number of times. Depending on the use of the application and the number of users, the predetermined number used in the process of block 958 can be any value. If the method determines that an item is popular, the update method 950 proceeds to block 961 where the OF INTEREST field is updated with a TRUE value. Alternatively, if the POPULAR field indicates that an item is not popular, the update method 950 proceeds to block 959 where the OF INTEREST field is updated with a FALSE value.

Upon the processing of blocks 959 or 961, the update method 950 continues to decision block 962 where the method determines if the current item is the last item in the database. If, at decision block 962, it is determined that the current item is not the last item in the database, the method continues to block 963 where the item counter is incremented to the next item for examination. From block 963, the update method 950 processes the next item in the database in a manner described above. If, at decision block 962, it is determined that the current item is the last item in the database, the update method 950 continues back to decision block 951 where the method waits for the next execution of the method.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for processing featured content on a client computer, the client computer having an operating system, the operating system including a system registry, the system registry containing information about computer configuration that the operating system continuously references during operation, the information including the applications installed on the computer, the types of documents creatable by the applications, the properties of folders and program icons, and the hardware configuration, the method comprising:

generating a signal indicating a successful boot of a software application;

generating, upon receipt of the signal indicating a successful boot of a software application without user input, a database query for featured content items, the featured content items having information focused on a specific topic, wherein the query comprises an identifier related to a particular topic, and wherein the featured content items forming the data set have at least one database attribute that is associated with the identifier, wherein each featured content item is associated with a plurality of database attributes including a priority status field;

receiving featured content items in response to the database query;

storing the featured content items in a local memory;

selecting a predetermined number of featured content items from the featured content items stored in the local memory;

storing the selected featured content items in the system registry;

in response to receiving a command from the software application to display at least one featured content item, wherein the command to display at least one featured content item is invoked during the boot process of a calling software application without user input, wherein user input includes pointer device movement, retrieving featured content items stored in the system registry and displaying the featured content items on a graphical user interface.

2. The method of claim 1, wherein the featured content items contain hyperlinks and text data associated with the hyperlinks.

3. The method of claim 1, wherein selecting a predetermined number of featured content items includes randomly selecting three featured content items from the featured content items stored in the local memory.

4. The method of claim 1, wherein the method further comprises:
   determining if at least one featured content item is stored in the system registry;
   if no featured content items are stored in the system registry, selecting a predetermined number of default items from a list of default items stored in the local memory, wherein selecting a predetermined number of featured content items includes randomly selecting three featured content items from the featured content items stored in the local memory; and
   displaying the data of the default items on a graphical user interface.

5. The method of claim 1, wherein the displayed featured content items provide instruction for operating a software application.

6. The method of claim 1, wherein the displayed featured content items include data that form an example search string, wherein the example search string is displayed on the graphical user interface with a text entry field for receiving search strings.

7. The method of claim 1, wherein the identifier is associated with at least one computer software application.

8. The method of claim 1, wherein the method further comprises:
   determining if individual featured content items are out of date; and
   if individual featured content items are out of date, removing the individual featured content items from the local memory.

9. The method of claim 1, wherein the query is configured with a database attribute to filter featured content items based on a value indicative of a rating associated with an individual featured content item.

10. A computer-readable medium containing computer-readable instructions which, when executed by a computer, perform the method of any one of claims 1-9.

11. A computer-implemented method of displaying featured content items in a hypertext document, the featured content items having information focused on a specific topic, the method comprises:
   generating a signal indicating a successful boot of a software application;
   generating, upon receipt of the signal indicating a successful boot of a software application without user input, a database query for featured content items, wherein the query is configured by parsing the data contained in the hypertext document to determine one or more identifiers associated with the topic, the featured content items having information focused on a specific topic, wherein the query comprises an identifier related to a particular topic, and wherein the featured content items forming the data set have at least one database attribute that is associated with the identifier, wherein each featured content item is associated with a plurality of database attributes including a priority status field;
   receiving featured content items in response to the database query;
   determining if the number of received featured content items is greater than a predetermined number of featured content items;
   if the number of received featured content items is greater than the predetermined number of featured content items, formatting said hypertext document to include at least one featured content item for display, the hypertext document being formatted to display the data of the featured content item with the contents of the hypertext document; and
   if the number of received featured content items is not greater than the predetermined number of featured content items, formatting said hypertext document without including the featured content items and displaying said hypertext document on a display.

12. The method of claim 11, wherein the method further comprises, formatting said hypertext document without the featured content items if the number of received featured content items is not greater than the predetermined number of featured content items.

13. The method of claim 11, wherein the method further comprises:
   determining if one or more of the featured content items has a priority status;
   if one or more of the featured content items has a priority status, selecting a predetermined number of featured content items having a priority status for display; and
   formatting said hypertext document to include said selected predetermined number of featured content items having a priority status, the hypertext document being formatted to display the selected number of featured content items having a priority status with the contents of the hypertext document.

14. The method of claim 11, wherein the query is configured with a database attribute to filter featured content items based on a value indicative of a rating associated with an individual featured content item.

15. A computer-readable medium containing computer-readable instructions which, when executed by a computer, perform the method of any one of claims 11-14.

16. A method for updating a database of featured content items, the featured content items having information focused on a specific topic, each featured content item of the database including an attribute that indicates if the featured content item is of interest or not of interest, wherein the method comprises:
   generating a signal indicating a successful boot of a software application;
   generating, upon receipt of the signal indicating a successful boot of a software application without user input, a database query for featured content items, the featured content items having information focused on a specific topic, wherein the query comprises an identifier related to a particular topic, and wherein the featured content items forming the data set have at least one database attribute that is associated with the identifier, wherein each featured content item is associated with a plurality of database attributes including a priority status field;
   determining, without user input, if a featured content item has expired;
   determining, without user input, if the featured content item is highly rated by a user;

if the featured content item has expired, modifying the attribute to indicate that the featured content item is not of interest; if the featured content item has not expired and if the featured content item is highly rated, modifying the attribute to indicate that the featured content item is of interest; and saving the modified attributes to a computer memory.

17. The method of claim 16, wherein the method further comprises:

determining if the featured content item is new; and if the featured content item has not expired and if the featured content item is new, modifying the attribute to indicate that the featured content item is of interest.

18. The method of claim 16, wherein the method further comprises:

determining if the featured content item has been displayed more than a predetermined number of times; and if the featured content item has not expired and if the featured content item has been displayed more than a predetermined number of times, modifying the attribute to indicate that the featured content item is of interest.

19. A computer-readable medium containing computer-readable instructions which, when executed by a computer, perform the method of any one of claims 16-18.

20. A computer-implemented method for processing featured content on a client computer, the client computer having an operating system, the operating system including a system registry, the system registry containing information about computer configuration that the operating system continuously references during operation, the information including the user profiles, the applications installed on the computer, the types of documents creatable by the applications, the properties of folders and program icons, and the hardware configuration, the method comprising:

determining if at least one featured content item is stored in the system registry;

if no featured content items are stored in the system registry, selecting a predetermined number of default items from a list of default items stored in memory and displaying the data of the default items on a graphical user interface;

if a featured content item is stored in the system registry, retrieving the featured content item from the system registry and displaying the featured content item on the graphical user interface;

determining if the client computer is connected to a computer network;

if the client computer is connected to a computer network, generating, without user input, a database query for featured content items, the featured content items having information focused on a specific topic;

receiving featured content items in response to the database query;

storing the featured content items in a local memory;

selecting a predetermined number of featured content items from the featured content items stored in the system registry;

storing the selected featured content items in the system registry;

in response to receiving a command from a software application to display at least one featured content item, without user input, retrieving featured content items stored in the system registry and displaying the featured content items on the graphical user interface;

if the client computer is not connected to a computer network, registering a callback request with a network status application program interface to be notified when the network status application program interface determines that the client computer is connected to the computer network;

determining if there are any up-to-date featured content items stored in the local memory;

if an up-to-date featured content item is stored in the local memory, storing the up-to-date featured content item in the system registry; and if no up-to-date featured content items stored in the local memory, removing the featured content items from the local memory.

* * * * *